(12) United States Patent
Cheung et al.

(10) Patent No.: US 8,054,344 B2
(45) Date of Patent: Nov. 8, 2011

(54) IMAGING SYSTEM AND METHOD WITH INTELLIGENT DIGITAL ZOOMING

(75) Inventors: Frank N. G. Cheung, Agoura, CA (US); Richard Chin, Torrance, CA (US); Hector Q. Gonzalez, Westlake Village, CA (US)

(73) Assignee: Raytheon Company, Waltham, PA (US)

( * ) Notice: Subject to any disclaimer, the term of this patent is extended or adjusted under 35 U.S.C. 154(b) by 1221 days.

(21) Appl. No.: 11/454,690

(22) Filed: Jun. 16, 2006

(65) Prior Publication Data

US 2007/0291138 A1    Dec. 20, 2007

(51) Int. Cl.
*H04N 5/262* (2006.01)
*H04N 5/225* (2006.01)
*H04N 7/18* (2006.01)

(52) U.S. Cl. ............. 348/240.2; 348/155; 348/169

(58) Field of Classification Search .... 348/240.1–240.3, 348/240.99, 155, 169, 220.1
See application file for complete search history.

(56) References Cited

U.S. PATENT DOCUMENTS

| | | | |
|---|---|---|---|
| 4,998,168 A * | 3/1991 | Gillard | 348/451 |
| 5,835,641 A | 11/1998 | Sotoda et al. | |
| 5,946,044 A | 8/1999 | Kondo et al. | |
| 6,236,433 B1 * | 5/2001 | Acharya et al. | 348/273 |
| 6,348,949 B1 | 2/2002 | McVeigh | |
| 6,876,387 B1 * | 4/2005 | Lee | 348/240.2 |
| 7,202,911 B2 * | 4/2007 | Brelay | 348/561 |
| 2002/0101535 A1 | 8/2002 | Swan | |
| 2007/0291138 A1 * | 12/2007 | Cheung et al. | 348/240.2 |

FOREIGN PATENT DOCUMENTS

| | | |
|---|---|---|
| EP | 0 270 269 A | 6/1988 |
| EP | 0 625 860 A2 | 11/1994 |
| GB | 2343317 A | 3/2000 |

OTHER PUBLICATIONS

Uomori K et al: "Electronic Image Stabilization System for Video Cameras and VCRS" SMPTE Journal, SMPTE Inc. Scarsdale, N.Y., US, vol. 101, No. 2, Feb. 1992 pp. 66-75, XP000252752 ISN: 0036-1682 p. 68, right-hand column, line 12-line 32.

* cited by examiner

*Primary Examiner* — Nhan T Tran
*Assistant Examiner* — Tuan Le
(74) *Attorney, Agent, or Firm* — Pillsbury Winthrop Shaw Pittman LLP

(57) ABSTRACT

A system and method for zooming an image. In the illustrative embodiment, the system includes a memory for receiving first and second frames of image data; a motion detector for detecting motion in said first or said second frame of image data; and an intelligent zoom system for zooming said first or said second image using a first or a second zoom method based on a detection of motion by said motion detector on a pixel by pixel basis. In the illustrative embodiment, the invention is scene-based, it works on a pixel by pixel basis to determine if a pixel is in motion. It performs motion related zoom for pixels that are affected by motion and conducts cross-field zoom for steady pixels to reduce motion artifacts in zoom mode. Motion may be determined by comparing frame-to-frame pixel value variations to fixed motion threshold(s) or by other algorithms. Independent-field zoom refers to using information from one input field to form a zoomed picture in one associated output field. Cross-field zoom refers to using information from both input fields to form a picture in an output field. The invention may be used with or without zoom interpolation schemes.

18 Claims, 17 Drawing Sheets

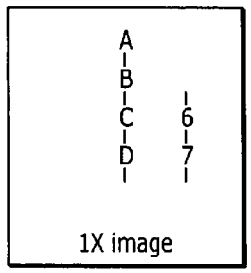
FIG. 1a (CONVENTIONAL)
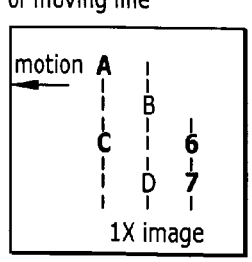
FIG. 1b (CONVENTIONAL)

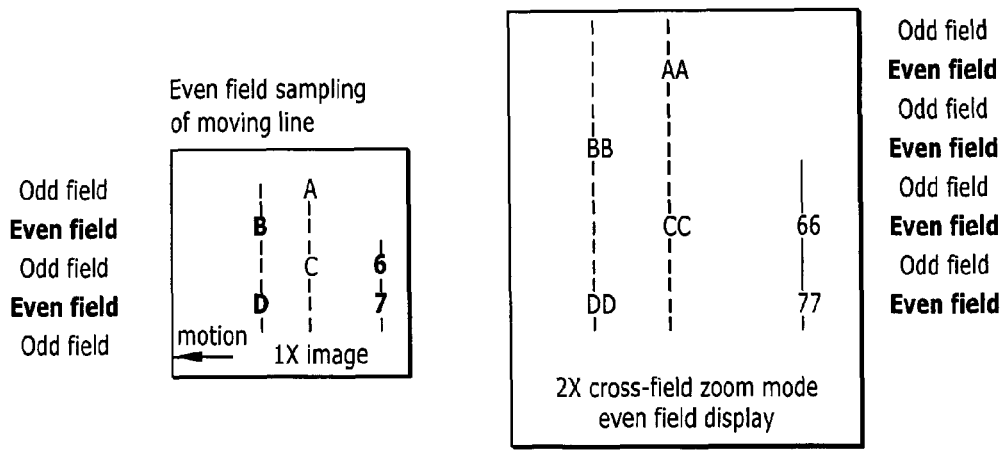

FIG. 1c (CONVENTIONAL)

FIG. 2a (CONV.)

Original Image

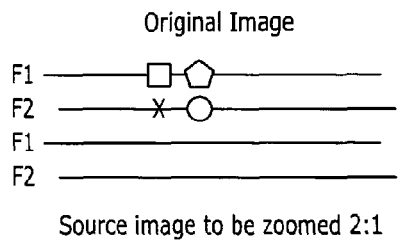

Source image to be zoomed 2:1

FIG. 2b (CONVENTIONAL)

Loss of Registration Information, No temporal artifacts,
Jagged staircase,
Best moving picture

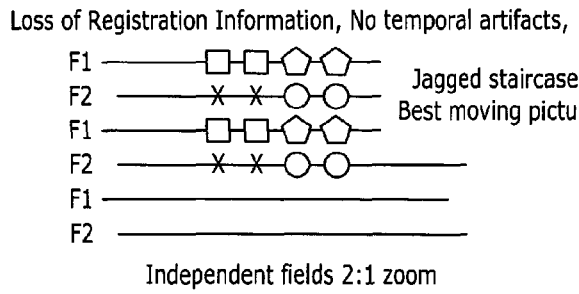

Independent fields 2:1 zoom

FIG. 2c (CONV.)

Loss of Registration Information,
temporal artifacts,
No jagged staircase

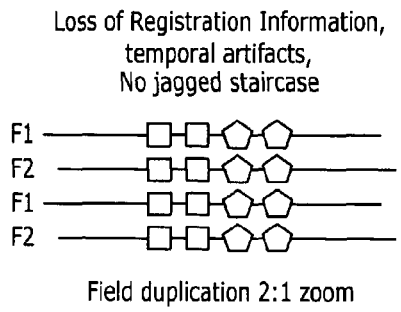

Field duplication 2:1 zoom

FIG. 2d (CONVENTIONAL)

No Registration Information loss,
temporal artifacts,
No jagged staircase

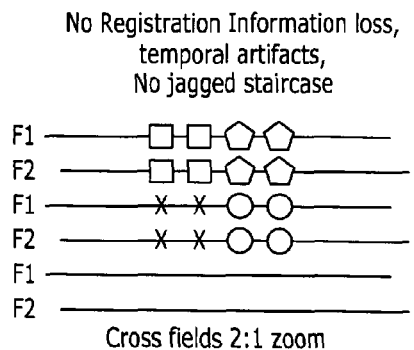

Cross fields 2:1 zoom

FIG. 3a (CONVENTIONAL)

Original Image

F1 ——————— 1A  1B  1C ———————
F2 ——————— 2A  2B  2C ———————
F1 ——————— 3A  3B  3C ———————
F2 ——————— 4A  4B  4C ———————

Source image to be zoomed 2:1

Full interpolation

| 1A | $\frac{1A+1B}{2}$ | 1B | $\frac{1B+1C}{2}$ |
|---|---|---|---|
| $\frac{1A+2A}{2}$ | $\frac{1A+1B+2A+2B}{4}$ | $\frac{1B+2B}{2}$ | $\frac{1B+1C+2B+2C}{4}$ |
| 2A | $\frac{2A+2B}{2}$ | 2B | $\frac{2A+2B}{2}$ |
| $\frac{2A+3A}{2}$ | $\frac{2A+2B+3A+3B}{4}$ | $\frac{2B+3B}{2}$ | $\frac{2B+2C+3B+3C}{4}$ |
| 3A | $\frac{3A+3B}{2}$ | 3B | $\frac{3B+3C}{2}$ |

No information loss, Has temporal artifacts, No jagged staircase, Best still picture

FIG. 3b (CONVENTIONAL)

Original Scene [S(K,L)]

|  | L= | 0 | 1 | 2 | 3 | 4 |
|---|---|---|---|---|---|---|
| odd | 0 | 1 | 2 | 3 | 4 | 5 |
| even | 1 | 6 | 7 | 8 | 9 | 10 |
| odd | 2 | 11 | 12 | 13 | 14 | 15 |
| even | 3 | 16 | 17 | 18 | 19 | 20 |
| odd | 4 | 21 | 22 | 23 | 24 | 25 |
| even | 5 =K | 26 | 27 | 28 | 29 | 30 |

FIG. 4a (CONVENTIONAL)

FIG. 4b

Cross field zoom [Zc(m,n)]

| | n= | 0 | 1 | 2 | 3 | 4 | 5 | 6 | 7 | 8 | 9 |
|---|---|---|---|---|---|---|---|---|---|---|---|
| odd | 0 | 1 | 1 | 2 | 2 | 3 | 3 | 4 | 4 | 5 | 5 |
| even | 1 | 1 | 1 | 2 | 2 | 3 | 3 | 4 | 4 | 5 | 5 |
| odd | 2 | 6 | 6 | 7 | 7 | 8 | 8 | 9 | 9 | 10 | 10 |
| even | 3 | 6 | 6 | 7 | 7 | 8 | 8 | 9 | 9 | 10 | 10 |
| odd | 4 | 11 | 11 | 12 | 12 | 13 | 13 | 14 | 14 | 15 | 15 |
| even | 5 | 11 | 11 | 12 | 12 | 13 | 13 | 14 | 14 | 15 | 15 |
| odd | 6 | 16 | 16 | 17 | 17 | 18 | 18 | 19 | 19 | 20 | 20 |
| even | 7 | 16 | 16 | 17 | 17 | 18 | 18 | 19 | 19 | 20 | 20 |
| odd | 8 | 21 | 21 | 22 | 22 | 23 | 23 | 24 | 24 | 25 | 25 |
| even | 9 | 21 | 21 | 22 | 22 | 23 | 23 | 24 | 24 | 25 | 25 |
| | 10 | 26 | 26 | 27 | 27 | 28 | 28 | 29 | 29 | 30 | 30 |
| | 11 | 26 | 26 | 27 | 27 | 28 | 28 | 29 | 29 | 30 | 30 |
| | =m | | | | | | | | | | |

FIG. 4c

Independent field zoom [Zi(m,n)]

| | n= | 0 | 1 | 2 | 3 | 4 | 5 | 6 | 7 | 8 | 9 |
|---|---|---|---|---|---|---|---|---|---|---|---|
| odd | 0 | 1 | 1 | 2 | 2 | 3 | 3 | 4 | 4 | 5 | 5 |
| even | 1 | 6 | 6 | 7 | 7 | 8 | 8 | 9 | 9 | 10 | 10 |
| odd | 2 | 1 | 1 | 2 | 2 | 3 | 3 | 4 | 4 | 5 | 5 |
| even | 3 | 6 | 6 | 7 | 7 | 8 | 8 | 9 | 9 | 10 | 10 |
| odd | 4 | 11 | 11 | 12 | 12 | 13 | 13 | 14 | 14 | 15 | 15 |
| even | 5 | 16 | 16 | 17 | 17 | 18 | 18 | 19 | 19 | 20 | 20 |
| odd | 6 | 11 | 11 | 12 | 12 | 13 | 13 | 14 | 14 | 15 | 15 |
| even | 7 | 16 | 16 | 17 | 17 | 18 | 18 | 19 | 19 | 20 | 20 |
| odd | 8 | 21 | 21 | 22 | 22 | 23 | 23 | 24 | 24 | 25 | 25 |
| even | 9 | 26 | 26 | 27 | 27 | 28 | 28 | 29 | 29 | 30 | 30 |
| | 10 | 21 | 21 | 22 | 22 | 23 | 23 | 24 | 24 | 25 | 25 |
| | 11 | 26 | 26 | 27 | 27 | 28 | 28 | 29 | 29 | 30 | 30 |
| | =m | | | | | | | | | | |

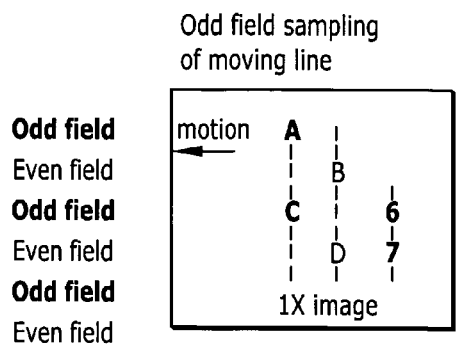
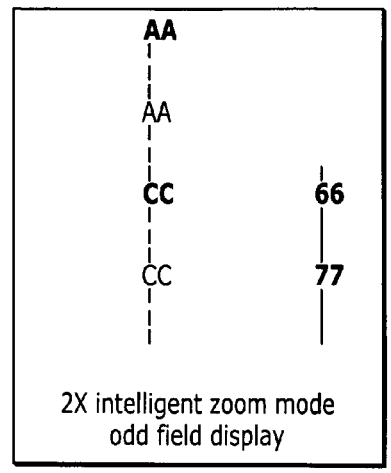
FIG. 5a
FIG. 5b
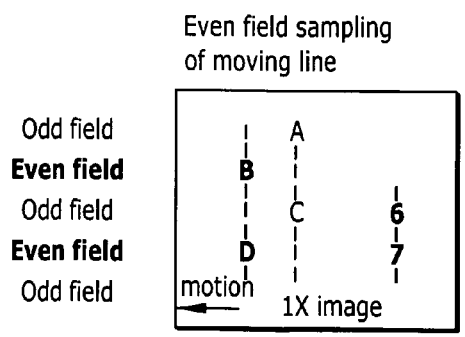
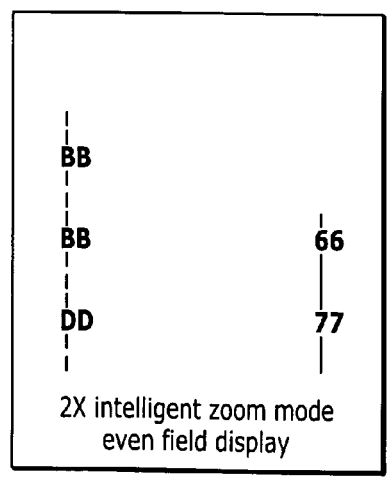
FIG. 5c
FIG. 5d

Original Scene [S(K,L)]

| L= | 0 | 1 | 2 | 3 | 4 | |
|---|---|---|---|---|---|---|
| 0 | 1 | 2 | 3 | 4 | 5 | odd |
| 1 | 6 | 7 | 8 | 9 | 10 | even |
| 2 | 11 | 12 | 13 | 14 | 15 | odd |
| 3 | 16 | 17 | X | 19 | 20 | even |
| 4 | 21 | 18 | 23 | 24 | 25 | odd |
| 5 | 26 | 27 | 28 | 29 | 30 | even |
| 6 | 31 | 32 | 33 | 34 | 35 | odd |

Intelligent zoom

| | n= | 0 | 1 | 2 | 3 | 4 | 5 | 6 | 7 | 8 | 9 |
|---|---|---|---|---|---|---|---|---|---|---|---|
| odd | 0 | 1 | 1 | 2 | 2 | 3 | 3 | 4 | 4 | 5 | 5 |
| even | 1 | 1 | 1 | 2 | 2 | 3 | 3 | 4 | 4 | 5 | 5 |
| odd | 2 | 6 | 6 | 7 | 7 | 8 | 8 | 9 | 9 | 10 | 10 |
| even | 3 | 6 | 6 | 7 | 7 | 8 | 8 | 9 | 9 | 10 | 10 |
| odd | 4 | 11 | 11 | 12 | 12 | 13 | 13 | 14 | 14 | 15 | 15 |
| even | 5 | 11 | 11 | 12 | 12 | X | X | 14 | 14 | 15 | 15 |
| odd | 6 | 16 | 16 | 17 | 17 | 13 | 13 | 19 | 19 | 20 | 20 |
| even | 7 | 16 | 16 | 17 | 17 | X | X | 19 | 19 | 20 | 20 |
| odd | 8 | 21 | 21 | 18 | 18 | 23 | 23 | 24 | 24 | 25 | 25 |
| even | 9 | 21 | 21 | 27 | 27 | 23 | 23 | 24 | 24 | 25 | 25 |
| | 10 | 26 | 26 | 18 | 18 | 28 | 28 | 29 | 29 | 30 | 30 |
| | 11 | 26 | 26 | 27 | 27 | 28 | 28 | 29 | 29 | 30 | 30 |
| | 12 | 31 | 31 | 32 | 32 | 33 | 33 | 34 | 34 | 35 | 35 |
| | 13 | 31 | 31 | 32 | 32 | 33 | 33 | 34 | 34 | 35 | 35 |

Independent field zoom [Zi(m,n)]

| n\m | 0 | 1 | 2 | 3 | 4 | 5 | 6 | 7 | 8 | 9 |
|---|---|---|---|---|---|---|---|---|---|---|
| 0 | 1 | 1 | 2 | 2 | 3 | 3 | 4 | 4 | 5 | 5 |
| 1 | 6 | 6 | 7 | 7 | 8 | 8 | 9 | 9 | 10 | 10 |
| 2 | 1 | 1 | 2 | 2 | 3 | 3 | 4 | 4 | 5 | 5 |
| 3 | 6 | 6 | 7 | 7 | 8 | 8 | 9 | 9 | 10 | 10 |
| 4 | 11 | 11 | 12 | 12 | 13 | 13 | 14 | 14 | 15 | 15 |
| 5 | 16 | 16 | 17 | 17 | X | X | 19 | 19 | 20 | 20 |
| 6 | 11 | 11 | 12 | 12 | 13 | 13 | 14 | 14 | 15 | 15 |
| 7 | 16 | 16 | 17 | 17 | X | X | 19 | 19 | 20 | 20 |
| 8 | 21 | 21 | 18 | 18 | 23 | 23 | 24 | 24 | 25 | 25 |
| 9 | 26 | 26 | 27 | 27 | 28 | 28 | 29 | 29 | 30 | 30 |
| 10 | 21 | 21 | 18 | 18 | 23 | 23 | 24 | 24 | 25 | 25 |
| 11 | 26 | 26 | 27 | 27 | 28 | 28 | 29 | 29 | 30 | 30 |
| 12 | 31 | 31 | 32 | 32 | 33 | 33 | 34 | 34 | 35 | 35 |
| 13 | 36 | 36 | 37 | 37 | 38 | 38 | 39 | 39 | 40 | 40 |

*FIG. 6c*

Cross field zoom [Zc(m,n)]

| n\m | | 0 | 1 | 2 | 3 | 4 | 5 | 6 | 7 | 8 | 9 |
|---|---|---|---|---|---|---|---|---|---|---|---|
| 0 | odd | 1 | 1 | 2 | 2 | 3 | 3 | 4 | 4 | 5 | 5 |
| 1 | even | 1 | 1 | 2 | 2 | 3 | 3 | 4 | 4 | 5 | 5 |
| 2 | odd | 6 | 6 | 7 | 7 | 8 | 8 | 9 | 9 | 10 | 10 |
| 3 | even | 6 | 6 | 7 | 7 | 8 | 8 | 9 | 9 | 10 | 10 |
| 4 | odd | 11 | 11 | 12 | 12 | 13 | 13 | 14 | 14 | 15 | 15 |
| 5 | even | 11 | 11 | 12 | 12 | 13 | 13 | 14 | 14 | 15 | 15 |
| 6 | odd | 16 | 16 | 17 | 17 | X | X | 19 | 19 | 20 | 20 |
| 7 | even | 16 | 16 | 17 | 17 | X | X | 19 | 19 | 20 | 20 |
| 8 | odd | 21 | 21 | 18 | 18 | 23 | 23 | 24 | 24 | 25 | 25 |
| 9 | even | 21 | 21 | 18 | 18 | 23 | 23 | 24 | 24 | 25 | 25 |
| 10 | | 26 | 26 | 27 | 27 | 28 | 28 | 29 | 29 | 30 | 30 |
| 11 | | 26 | 26 | 27 | 27 | 28 | 28 | 29 | 29 | 30 | 30 |
| 12 | | 31 | 31 | 32 | 32 | 33 | 33 | 34 | 34 | 35 | 35 |
| 13 | | 31 | 31 | 32 | 32 | 33 | 33 | 34 | 34 | 35 | 35 |

*FIG. 6d*

Zoom factor= 2
Threshold= 0
Sim background= 4
Steady state

| L= | 0 | 1 | 2 | 3 | 4 | |
|---|---|---|---|---|---|---|
| 0 | 1 | 2 | 3 | 4 | 5 | odd |
| 1 | 6 | 7 | 8 | 9 | 10 | even |
| 2 | 11 | 12 | 13 | 14 | 15 | odd |
| 3 | 16 | 17 | 18 | 19 | 20 | even |
| 4 | 21 | 22 | 23 | 24 | 25 | odd |
| 5 | 26 | 27 | 28 | 29 | 30 | even |
| 6 | 31 | 32 | 33 | 34 | 35 | odd |
| 7 | 36 | 37 | 38 | 39 | 40 | even |
| =k | | | | | | |

*FIG. 8a*

Cross field zoom

| n= | 0 | 1 | 2 | 3 | 4 | 5 | 6 | 7 | 8 | 9 | |
|---|---|---|---|---|---|---|---|---|---|---|---|
| 0 | 1 | 1 | 2 | 2 | 3 | 3 | 4 | 4 | 5 | 5 | odd |
| 1 | 1 | 1 | 2 | 2 | 3 | 3 | 4 | 4 | 5 | 5 | even |
| 2 | 6 | 6 | 7 | 7 | 8 | 8 | 9 | 9 | 10 | 10 | odd |
| 3 | 6 | 6 | 7 | 7 | 8 | 8 | 9 | 9 | 10 | 10 | even |
| 4 | 11 | 11 | 12 | 12 | 13 | 13 | 14 | 14 | 15 | 15 | odd |
| 5 | 11 | 11 | 12 | 12 | 13 | 13 | 14 | 14 | 15 | 15 | even |
| 6 | 16 | 16 | 17 | 17 | 18 | 18 | 19 | 19 | 20 | 20 | odd |
| 7 | 16 | 16 | 17 | 17 | 18 | 18 | 19 | 19 | 20 | 20 | even |
| 8 | 21 | 21 | 22 | 22 | 23 | 23 | 24 | 24 | 25 | 25 | odd |
| 9 | 21 | 21 | 22 | 22 | 23 | 23 | 24 | 24 | 25 | 25 | even |
| 10 | 26 | 26 | 27 | 27 | 28 | 28 | 29 | 29 | 30 | 30 | odd |
| 11 | 26 | 26 | 27 | 27 | 28 | 28 | 29 | 29 | 30 | 30 | even |
| 12 | 31 | 31 | 32 | 32 | 33 | 33 | 34 | 34 | 35 | 35 | odd |
| 13 | 31 | 31 | 32 | 32 | 33 | 33 | 34 | 34 | 35 | 35 | even |
| 14 | 36 | 36 | 37 | 37 | 38 | 38 | 39 | 39 | 40 | 40 | odd |
| 15 | 36 | 36 | 37 | 37 | 38 | 38 | 39 | 39 | 40 | 40 | even |
| =m | | | | | | | | | | | |

Intelligent zoom

| n= | 0 | 1 | 2 | 3 | 4 | 5 | 6 | 7 | 8 | 9 | |
|---|---|---|---|---|---|---|---|---|---|---|---|
| 0 | 1 | 1 | 2 | 2 | 3 | 3 | 4 | 4 | 5 | 5 | odd |
| 1 | 1 | 1 | 2 | 2 | 3 | 3 | 4 | 4 | 5 | 5 | even |
| 2 | 6 | 6 | 7 | 7 | 8 | 8 | 9 | 9 | 10 | 10 | odd |
| 3 | 6 | 6 | 7 | 7 | 8 | 8 | 9 | 9 | 10 | 10 | even |
| 4 | 11 | 11 | 12 | 12 | 13 | 13 | 14 | 14 | 15 | 15 | odd |
| 5 | 11 | 11 | 12 | 12 | 13 | 13 | 14 | 14 | 15 | 15 | even |
| 6 | 16 | 16 | 17 | 17 | 18 | 18 | 19 | 19 | 20 | 20 | odd |
| 7 | 16 | 16 | 17 | 17 | 18 | 18 | 19 | 19 | 20 | 20 | even |
| 8 | 21 | 21 | 22 | 22 | 23 | 23 | 24 | 24 | 25 | 25 | odd |
| 9 | 21 | 21 | 22 | 22 | 23 | 23 | 24 | 24 | 25 | 25 | even |
| 10 | 26 | 26 | 27 | 27 | 28 | 28 | 29 | 29 | 30 | 30 | odd |
| 11 | 26 | 26 | 27 | 27 | 28 | 28 | 29 | 29 | 30 | 30 | even |
| 12 | 31 | 31 | 32 | 32 | 33 | 33 | 34 | 34 | 35 | 35 | odd |
| 13 | 31 | 31 | 32 | 32 | 33 | 33 | 34 | 34 | 35 | 35 | even |
| 14 | 36 | 36 | 37 | 37 | 38 | 38 | 39 | 39 | 40 | 40 | odd |
| 15 | 36 | 36 | 37 | 37 | 38 | 38 | 39 | 39 | 40 | 40 | even |

Scene Condition

| L= | 0 | 1 | 2 | 3 | 4 | |
|---|---|---|---|---|---|---|
| 0 | 1 | 2 | 3 | 4 | 5 | odd |
| 1 | 6 | 7 | 8 | 9 | 100 | even |
| 2 | 11 | 12 | 13 | 10 | 150 | odd |
| 3 | 16 | 17 | 18 | 15 | 200 | even |
| 4 | 21 | 22 | 23 | 20 | 250 | odd |
| 5 | 26 | 27 | 28 | 25 | 30 | even |
| 6 | 31 | 32 | 33 | 34 | 35 | odd |
| 7 | 36 | 37 | 38 | 39 | 40 | even |

Cross field zoom

| | 0 | 1 | 2 | 3 | 4 | 5 | 6 | 7 | 8 | 9 | |
|---|---|---|---|---|---|---|---|---|---|---|---|
| 0 | 1 | 1 | 2 | 2 | 3 | 3 | 4 | 4 | 5 | 5 | odd |
| 1 | 1 | 1 | 2 | 2 | 3 | 3 | 4 | 4 | 5 | 5 | even |
| 2 | 6 | 6 | 7 | 7 | 8 | 8 | 9 | 9 | 10 | 10 | odd |
| 3 | 6 | 6 | 7 | 7 | 8 | 8 | 9 | 9 | 10 | 10 | even |
| 4 | 11 | 11 | 12 | 12 | 13 | 13 | 10 | 10 | 150 | 150 | odd |
| 5 | 11 | 11 | 12 | 12 | 13 | 13 | 10 | 10 | 150 | 150 | even |
| 6 | 16 | 16 | 17 | 17 | 18 | 18 | 19 | 19 | 20 | 20 | odd |
| 7 | 16 | 16 | 17 | 17 | 18 | 18 | 19 | 19 | 20 | 20 | even |
| 8 | 21 | 21 | 22 | 22 | 23 | 23 | 20 | 20 | 250 | 250 | odd |
| 9 | 21 | 21 | 22 | 22 | 23 | 23 | 20 | 20 | 250 | 250 | even |
| 10 | 26 | 26 | 27 | 27 | 28 | 28 | 29 | 29 | 30 | 30 | odd |
| 11 | 26 | 26 | 27 | 27 | 28 | 28 | 29 | 29 | 30 | 30 | even |
| 12 | 31 | 31 | 32 | 32 | 33 | 33 | 34 | 34 | 35 | 35 | odd |
| 13 | 31 | 31 | 32 | 32 | 33 | 33 | 34 | 34 | 35 | 35 | even |
| 14 | 36 | 36 | 37 | 37 | 38 | 38 | 39 | 39 | 40 | 40 | odd |
| 15 | 36 | 36 | 37 | 37 | 38 | 38 | 39 | 39 | 40 | 40 | even |

FIG. 8e

Intelligent zoom

| | 0 | 1 | 2 | 3 | 4 | 5 | 6 | 7 | 8 | 9 | |
|---|---|---|---|---|---|---|---|---|---|---|---|
| 0 | 1 | 1 | 2 | 2 | 3 | 3 | 4 | 4 | 5 | 5 | odd |
| 1 | | | | | | | | | | | even |
| 2 | 6 | 6 | 7 | 7 | 8 | 8 | 9 | 9 | 10 | 10 | odd |
| 3 | | | | | | | | | | | even |
| 4 | 11 | 11 | 12 | 12 | 13 | 13 | 10 | 10 | 150 | 150 | odd |
| 5 | | | | | | | | | | | even |
| 6 | 16 | 16 | 17 | 17 | 18 | 18 | 10 | 10 | 150 | 150 | odd |
| 7 | | | | | | | | | | | even |
| 8 | 21 | 21 | 22 | 22 | 23 | 23 | 20 | 20 | 250 | 250 | odd |
| 9 | | | | | | | | | | | even |
| 10 | 26 | 26 | 27 | 27 | 28 | 28 | 20 | 20 | 250 | 250 | odd |
| 11 | | | | | | | | | | | even |
| 12 | 31 | 31 | 32 | 32 | 33 | 33 | 34 | 34 | 35 | 35 | odd |
| 13 | | | | | | | | | | | even |
| 14 | 36 | 36 | 37 | 37 | 38 | 38 | 39 | 39 | 40 | 40 | odd |
| 15 | | | | | | | | | | | even |

FIG. 8f

Scene Condition

L=

| | 0 | 1 | 2 | 3 | 4 | |
|---|---|---|---|---|---|---|
| 0 | 1 | 2 | 3 | 4 | 5 | odd |
| 1 | 6 | 7 | 8 | 9 | 100 | even |
| 2 | 11 | 12 | 13 | 14 | 150 | odd |
| 3 | 16 | 17 | 10 | 19 | 200 | even |
| 4 | 21 | 22 | 15 | 24 | 250 | odd |
| 5 | 26 | 27 | 20 | 29 | 30 | even |
| 6 | 31 | 32 | 25 | 34 | 35 | odd |
| 7 | 36 | 37 | 38 | 39 | 40 | even |

*FIG. 9a*

Cross field zoom

| | 0 | 1 | 2 | 3 | 4 | 5 | 6 | 7 | 8 | 9 | |
|---|---|---|---|---|---|---|---|---|---|---|---|
| 0 | 1 | 1 | 2 | 2 | 3 | 3 | 4 | 4 | 5 | 5 | odd |
| 1 | 1 | 1 | 2 | 2 | 3 | 3 | 4 | 4 | 5 | 5 | even |
| 2 | 6 | 6 | 7 | 7 | 8 | 8 | 9 | 9 | 100 | 100 | odd |
| 3 | 6 | 6 | 7 | 7 | 8 | 8 | 9 | 9 | 100 | 100 | even |
| 4 | 11 | 11 | 12 | 12 | 13 | 13 | 10 | 10 | 150 | 150 | odd |
| 5 | 11 | 11 | 12 | 12 | 13 | 13 | 10 | 10 | 150 | 150 | even |
| 6 | 16 | 16 | 17 | 17 | 10 | 10 | 19 | 19 | 200 | 200 | odd |
| 7 | 16 | 16 | 17 | 17 | 10 | 10 | 19 | 19 | 200 | 200 | even |
| 8 | 21 | 21 | 22 | 22 | 23 | 23 | 20 | 20 | 250 | 250 | odd |
| 9 | 21 | 21 | 22 | 22 | 23 | 23 | 20 | 20 | 250 | 250 | even |
| 10 | 26 | 26 | 27 | 27 | 20 | 20 | 29 | 29 | 30 | 30 | odd |
| 11 | 26 | 26 | 27 | 27 | 20 | 20 | 29 | 29 | 30 | 30 | even |
| 12 | 31 | 31 | 32 | 32 | 33 | 33 | 34 | 34 | 35 | 35 | odd |
| 13 | 31 | 31 | 32 | 32 | 33 | 33 | 34 | 34 | 35 | 35 | even |
| 14 | 36 | 36 | 37 | 37 | 38 | 38 | 39 | 39 | 40 | 40 | odd |
| 15 | 36 | 36 | 37 | 37 | 38 | 38 | 39 | 39 | 40 | 40 | even |

Intelligent zoom

| n= | 0 | 1 | 2 | 3 | 4 | 5 | 6 | 7 | 8 | 9 | |
|---|---|---|---|---|---|---|---|---|---|---|---|
| 0 | | | | | | | | | | | odd |
| 1 | 1 | 1 | 2 | 2 | 3 | 3 | 4 | 4 | 100 | 100 | even |
| 2 | | | | | | | | | | | odd |
| 3 | 6 | 6 | 7 | 7 | 8 | 8 | 9 | 9 | 100 | 100 | even |
| 4 | | | | | | | | | | | odd |
| 5 | 11 | 11 | 12 | 12 | 10 | 10 | 19 | 19 | 200 | 200 | even |
| 6 | | | | | | | | | | | odd |
| 7 | 16 | 16 | 17 | 17 | 10 | 10 | 19 | 19 | 200 | 200 | even |
| 8 | | | | | | | | | | | odd |
| 9 | 21 | 21 | 22 | 22 | 20 | 20 | 29 | 29 | 30 | 30 | even |
| 10 | | | | | | | | | | | odd |
| 11 | 26 | 26 | 27 | 27 | 20 | 20 | 29 | 29 | 30 | 30 | even |
| 12 | | | | | | | | | | | odd |
| 13 | 31 | 31 | 32 | 32 | 33 | 33 | 34 | 34 | 35 | 35 | even |
| 14 | | | | | | | | | | | odd |
| 15 | 36 | 36 | 37 | 37 | 38 | 38 | 39 | 39 | 40 | 40 | even |

FIG. 9d

Scene Condition

| L= | 0 | 1 | 2 | 3 | 4 | |
|---|---|---|---|---|---|---|
| 0 | 1 | 2 | 3 | 4 | 5 | odd |
| 2 | 6 | 7 | 8 | 9 | 100 | even |
| 2 | 11 | 12 | 13 | 14 | 150 | odd |
| 3 | 16 | 17 | 18 | 19 | 200 | even |
| 4 | 21 | 10 | 23 | 24 | 250 | odd |
| 5 | 26 | 15 | 28 | 29 | 30 | even |
| 6 | 31 | 20 | 33 | 34 | 35 | odd |
| 7 | 36 | 25 | 38 | 39 | 40 | even |

FIG. 9e

Cross field zoom

|   | 0 | 1 | 2 | 3 | 4 | 5 | 6 | 7 | 8 | 9 | |
|---|---|---|---|---|---|---|---|---|---|---|---|
| 0 | 1 | 1 | 2 | 2 | 3 | 3 | 4 | 4 | 5 | 5 | odd |
| 1 | 1 | 1 | 2 | 2 | 3 | 3 | 4 | 4 | 5 | 5 | even |
| 2 | 6 | 6 | 7 | 7 | 8 | 8 | 9 | 9 | 100 | 100 | odd |
| 3 | 6 | 6 | 7 | 7 | 8 | 8 | 9 | 9 | 100 | 100 | even |
| 4 | 11 | 11 | 12 | 12 | 13 | 13 | 14 | 14 | 150 | 150 | odd |
| 5 | 11 | 11 | 12 | 12 | 13 | 13 | 14 | 14 | 150 | 150 | even |
| 6 | 16 | 16 | 17 | 17 | 10 | 10 | 19 | 19 | 200 | 200 | odd |
| 7 | 16 | 16 | 17 | 17 | 10 | 10 | 19 | 19 | 200 | 200 | even |
| 8 | 21 | 21 | 10 | 10 | 23 | 23 | 24 | 24 | 250 | 250 | odd |
| 9 | 21 | 21 | 10 | 10 | 23 | 23 | 24 | 24 | 250 | 250 | even |
| 10 | 26 | 26 | 27 | 27 | 20 | 20 | 29 | 29 | 30 | 30 | odd |
| 11 | 26 | 26 | 27 | 27 | 20 | 20 | 29 | 29 | 30 | 30 | even |
| 12 | 31 | 31 | 20 | 20 | 33 | 33 | 34 | 34 | 35 | 35 | odd |
| 13 | 31 | 31 | 20 | 20 | 33 | 33 | 34 | 34 | 35 | 35 | even |
| 14 | 36 | 36 | 37 | 37 | 38 | 38 | 39 | 39 | 40 | 40 | odd |
| 15 | 36 | 36 | 37 | 37 | 38 | 38 | 39 | 39 | 40 | 40 | even |

FIG. 9f

Intelligent zoom

| n= | 0 | 1 | 2 | 3 | 4 | 5 | 6 | 7 | 8 | 9 | |
|---|---|---|---|---|---|---|---|---|---|---|---|
| 0 | 1 | 1 | 2 | 2 | 3 | 3 | 4 | 4 | 5 | 5 | odd |
| 1 |   |   |   |   |   |   |   |   |   |   | even |
| 2 | 6 | 6 | 7 | 7 | 8 | 8 | 9 | 9 | 5 | 5 | odd |
| 3 |   |   |   |   |   |   |   |   |   |   | even |
| 4 | 11 | 11 | 12 | 12 | 13 | 13 | 14 | 14 | 150 | 150 | odd |
| 5 |   |   |   |   |   |   |   |   |   |   | even |
| 6 | 16 | 16 | 17 | 17 | 13 | 13 | 14 | 14 | 150 | 150 | odd |
| 7 |   |   |   |   |   |   |   |   |   |   | even |
| 8 | 21 | 21 | 10 | 10 | 23 | 23 | 24 | 24 | 250 | 250 | odd |
| 9 |   |   |   |   |   |   |   |   |   |   | even |
| 10 | 26 | 26 | 10 | 10 | 23 | 23 | 24 | 24 | 30 | 30 | odd |
| 11 |   |   |   |   |   |   |   |   |   |   | even |
| 12 | 31 | 31 | 20 | 20 | 33 | 33 | 34 | 34 | 35 | 35 | odd |
| 13 |   |   |   |   |   |   |   |   |   |   | even |
| 14 | 36 | 36 | 20 | 20 | 38 | 38 | 39 | 39 | 40 | 40 | odd |
| 15 |   |   |   |   |   |   |   |   |   |   | even |

IMAGING SYSTEM AND METHOD WITH INTELLIGENT DIGITAL ZOOMING

BACKGROUND OF THE INVENTION

1. Field of the Invention

The present invention relates to imaging systems. More specifically, the present invention relates to imaging systems with digital image zooming capability.

2. Description of the Related Art

Imaging systems are used for a variety of consumer, commercial, industrial, scientific and military applications to name a few. In many systems, an imaging device for camera has a resolution that exceeds that of a display on which the image is to be viewed. If thee is an interest in viewing a portion of the image in greater detail, the image is magnified digitally by zooming in on the area of interest.

To avoid leaping images, the detector of the imaging system often operates in a field-to-field row interlacing mode to increase the scene update rate of the system. That is, the displays typically present the images with alternating image fields with each field presenting alternate adjacent rows of image data. For example, the first field might present an image with even number rows while the second field presents an image with odd numbered rows. This scheme is generally known in the art as an interlaced scanning scheme as the rows of the first field are interlaced between the rows of the second field.

Unfortunately, in certain applications, a portion of the scene or a target object in a field of view of the camera may be in motion. In some cases, when a scene is digitally zoomed, the motion may cause the image to appear ripped or distorted.

Most conventional approaches to correct motion-induced scene artifacts employ algorithms that derive and apply an operation globally to all pixels without paying attention to specific pixels in response to certain system parameters. For example, an accelerometer may be used to detect if the sensor is in motion and then determines the most appropriate zoom algorithm to be used across the entire field or frame. However, in reality, part of the scene may be stationary and part of it may have moving objects. Applying one operation globally may not minimize zoom artifacts of the entire scene.

Other electronic zoom algorithms may be individual pixel based, but those approaches have, for the most part, emphasized image smoothing as opposed to the zooming operation per se.

Hence, there is a need in the art for an improved system or method for providing for electronic zoom in imaging applications where at least part of the scene is moving at a speed sufficiently high to induce artifacts in the displayed image.

SUMMARY OF THE INVENTION

The need in the art is addressed by the system and method for zooming an image of the present invention. In the illustrative embodiment, the system includes a memory for receiving first and second frames of image data; a motion detector for detecting motion in said first or said second frame of image data; and an intelligent zoom system for zooming said first or said second image using a first or a second zoom method based on a detection of motion by said motion detector on a pixel by pixel basis.

In the illustrative embodiment, the invention is scene-based; it works on a pixel by pixel basis to determine if a pixel is in motion. It performs independent-field zoom for pixels that are in motion and conducts cross-field zoom for steady pixels to reduce motion artifacts in zoom mode. Motion may be determined by comparing frame-to-frame pixel value variations to fixed motion threshold(s) or by other algorithms. Independent-field zoom refers to using information from one input field to form a zoomed picture in one associated output field. Cross-field zoom refers to using information from both input to form a picture in an output field. The invention may be used with or without zoom interpolation schemes.

BRIEF DESCRIPTION OF THE DRAWINGS

FIG. 1a is a diagram that illustrates cross-field 2× electronic zoom in accordance with conventional teachings.

FIG. 1b is a diagram that illustrates cross-field 2× electronic zoom with odd field artifacts in accordance with conventional teachings.

FIG. 1c is a diagram that illustrates cross-field 2× electronic zoom with even field artifacts in accordance with convention teachings.

FIG. 2a is a diagram which represents detected pixel values in an original image.

FIG. 2b is a diagram which represents detected pixel values in the original image of FIG. 2a with 2:1 independent field zoom.

FIG. 2c is a diagram which represents detected pixel values in the original image of FIG. 2a with 2:1 field duplication zoom.

FIG. 2d is a diagram which represents detected pixel values in the original image of FIG. 2a with 2:1 cross-fields zoom.

FIG. 3a shows representative values in an original image.

FIG. 3b shoes the result of a linear interpolation smoothing method applied thereto.

FIG. 4a is another diagram showing representative pixel values in an original scene.

FIG. 4b is a diagram showing a cross-field zoom version of the scene depicted in FIG. 4a.

FIG. 4c is a diagram showing an independent field zoom version of the scene depicted in FIG. 4a.

FIG. 5a is a diagram depicting odd field sampling of a moving line.

FIG. 5b depicts the intelligent zoom operation of the present invention with respect to the odd field picture of FIG. 5a.

FIG. 5c is a diagram depicting even field sampling of a moving line.

FIG. 5d depicts the intelligent zoom operation of the present invention with respect to the even field picture of FIG. 5c.

FIG. 6a depicts an original scene with pixel 18 moved to location of pixel 22.

FIG. 6b shows intelligent zoom in accordance with the present teachings.

FIG. 6c is conventional independent-field zoom in response to pixel motion in FIG. 6a.

FIG. 6d shows conventional cross-field zoom in response to pixel motion in FIG. 6a.

FIG. 8a shows an original scene of conventional detector video.

FIG. 8b shows the field of FIG. 8a after a cross-field zoom operation in accordance with conventional teachings under steady state conditions.

FIG. 8c shows the field of FIG. 8a after an intelligent zoom operation in accordance with teachings of the present invention under steady state conditions.

FIG. 8d shows the original scene without zoom after diagonal movement downward and to the left of a vertical pole of selected pixels.

FIG. 8e shows an odd field display as a result of cross-field zoom after the motion depicted in FIG. 8d.

FIG. 8f shows an odd field display as a result of an intelligent zoom operation of the present invention after the motion depicted in FIG. 8d.

FIG. 9a is a continuation of FIG. 8d showing the original scene of conventional detector video without zoom after two steps of diagonally downward and to the left movement of a vertical pole of selected pixels.

FIG. 9b shows the even field of FIG. 9a after a cross-field zoom operation in accordance with conventional teachings after the specified movement.

FIG. 9c shows the field of FIG. 9a after an intelligent zoom operation in accordance with teachings of the present invention after the specified movement.

FIG. 9d shows the detector scene without zoom after three steps of diagonal movement downward and to the left of a vertical pole of selected pixels.

FIG. 9e shows an odd field display as a result of cross-field zoom after the motion depicted in FIG. 9d.

FIG. 9f shows an odd field display as a result of intelligent zoom operation of the present invention after the motion depicted in FIG. 9d.

DESCRIPTION OF THE INVENTION

Figure 7:
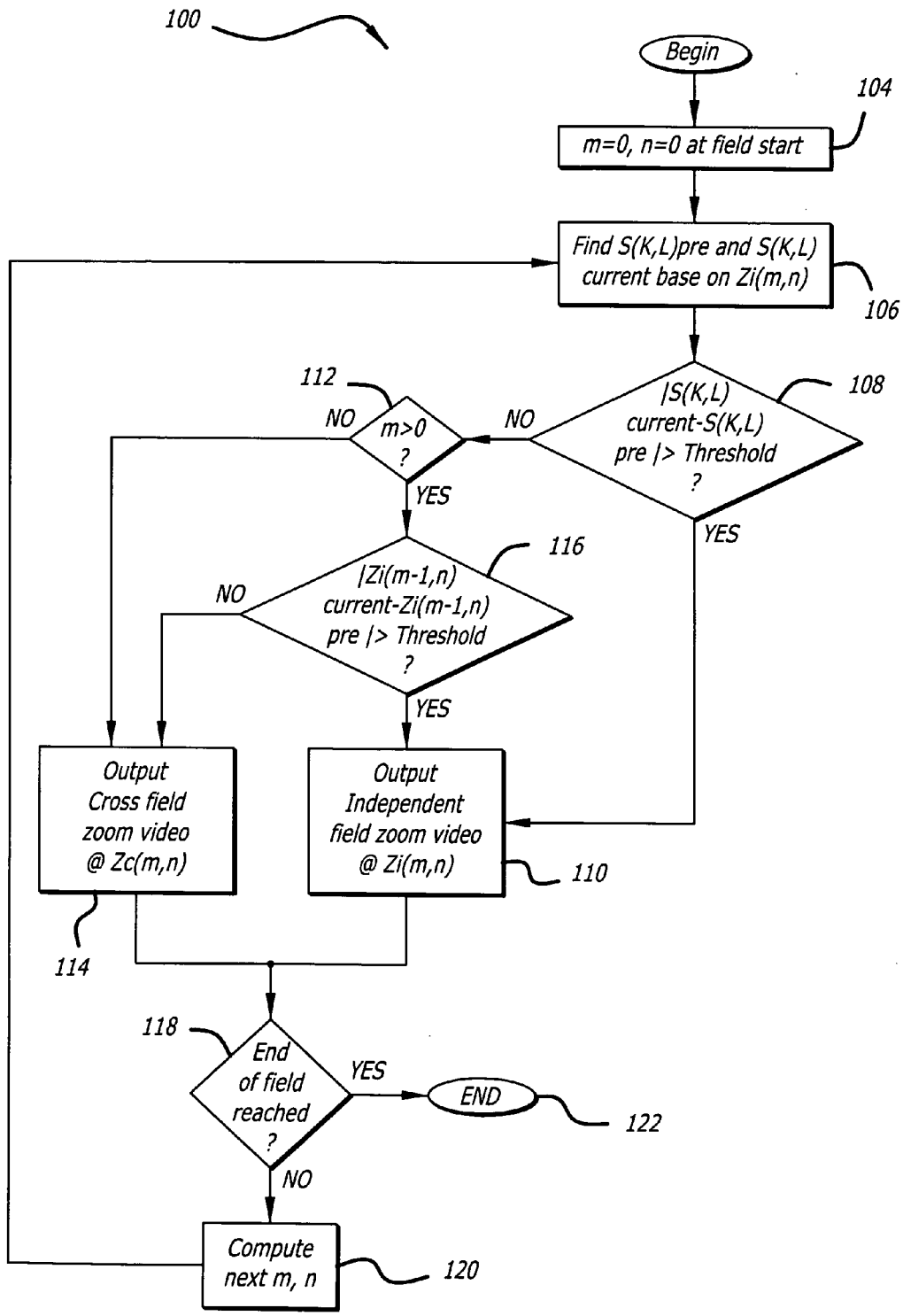
FIG. 7 is a flow diagram of an illustrative implementation of the inventive switching method for 2× zoom.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As discussed above, in accordance with conventional teachings, when a detector operates in a field-to-field row interlacing mode, motion artifacts may appear when the image is zoomed electronically. This is illustrated in FIGS. 1a, 1b and 1c. The initial (1×) image shown on left side picture of FIG. 1a is sampled in field-interlacing manner.

FIG. 1a is a diagram that illustrates cross-field 2× electronic zoom in accordance with conventional teachings. In order to have the image display correctly in 2× zoom, each output display field must contain information collected across both input fields. For example, display odd field contains pixels (A, C, 6) from odd input field and pixels (B, D, 7) from even input field. This is usually as cross-field zoom, as shown in right side picture of FIG. 1a.

When pixels A, B, C, and D are in motion in the 1× image, zoom artifact appears, as shown in FIG. 1b. FIG. 1b is a diagram that illustrates cross-field 2×electronic zoom with odd field artifacts in accordance with conventional teachings. For illustration, pixels ABCD are first sampled by odd field rows as shown in 1×image of FIG. 1b. Thus, only half of line ABCD pixels are registered into their new locations (as shown by pixels A and C).

When a 2× cross-field zoom is applied, the relation among pixels A, B, C and D is distorted on the odd field image shown by right picture of FIG. 1b. The picture distortion appears as a tearing and is the result of showing cross-field input information onto the same output display field. Motion of line ABCD is further sampled by the even field as shown in FIG. 1c.

FIG. 1c is a diagram that illustrates cross-field 2× electronic zoom with even field artifacts in accordance with conventional teachings. Again, note the motion induced artifact in the even field in this case as well. Line 67 remains intact because there is no motion.

Many methods for electronic zoom are known in the art. FIG. 2 illustrates various conventional methods for electronic zoom. The original 1× image is shown in FIG. 2a. The 2:1 independent-field zoom is shown in FIG. 2b. This zoom method tackles the motion artifact problem by using only pixel information from one input field to form a zoomed picture in one associated output field. For example "X"shows up only in F2 of the original and the zoomed image, but not in F1. The independent field zoom is geared for motion. However, it causes jagged staircase type of zoom artifacts when picture is still. The field duplication method shown in FIG. 2c basically doubles information in only one field to perform the zoom. This typically results in significant information loss. The cross-field zoom discussed above is shown in FIG. 2d. This is the standard no-motion zoom case. However, even in this case, artifacts result with moving objects. The cross-field zoom replicates pixels from the original scene onto both odd and even fields of the zoom domain. It offers a true representation of the original scene, but fast moving objects within the scene may appear deteriorated in the zoom domain due to the interlaced nature of data collection mechanism (i.e. detector).

The independent field zoom provides a jagged staircase type of image twisting, not suitable for stationary objects, but the moving objects maintain field to field position intact and undistorted, best for viewing objects at moderate speed. For high speed moving objects, it is more suitable to display them using field duplication zoom. The resolution and sample rate are reduced, moving images may appear jerky but intact with respect to position.

Different interpolation algorithms can be applied to smooth out the electronically zoomed image. FIG. 3a shows an original image and FIG. 3b shows the result of a linear interpolation smoothing method applied to the 2× cross-field zoomed image.

Conventional, only a per-field zoom process is applied to the entire image rather than paying attention to individual pixel needs. For example, an accelerometer may be used to detect if the sensor is in motion. It then determines which zoom algorithm is most appropriate to be used across the entire field or frame. However, in practice, part of the scene may be stationary and part of it may have moving objects. Applying only one standard may not minimize zoom artifacts of the entire scene.

In accordance with the present teachings, an intelligent zoom method is used that is scene-based. The inventive system and method works on a pixel-by-pixel basis based on whether the pixel is in motion. The invention performs independent-field zoom for pixels that are in motion and conducts cross-field zoom for steady pixels to reduce motion artifacts in zoom mode. In the illustrative embodiment, the inventive method compares current and previous frame(s) intensity values of a pixel in the scene domain and determines if the difference is greater than a motion threshold. The motion threshold can be a fixed value or provided via real time algorithm control. Other motion detection and zoom method selection algorithms may be applied without deviating from the scope of this invention.

A representation of an original scene [S(K,L)] as received and detected by an imaging apparatus (not shown) is shown in FIG. 4a along with its cross and independent field zoom versions [Zc(m,n) and Zi(m,n)] which are shown in FIGS. 4b and 4c respectively. As illustrated in FIGS. 4a-c, the original scene is sampled by a detector in a field interlaced fashion. The cross-field zoom replicates pixels from the original scene onto both odd and even fields of the display. For example, a pixel of value 8 on row 1, column 2 of the original scene is replicated into both odd field locations (2, 4), (2, 5) and even field locations (3, 4) and (3, 5) of the display under 2× zoom. The independent field zoom, replicates the same pixel (pixel of value 8 at location (1, 2) of original scene) only onto its respective fields. For example, the pixel of value 8 of the original scene is on an event field. Thus, the pixel is replicated onto locations (1, 4), (1, 5), (3, 4) and (3, 5), all on the even field of the display under 2× zoom. For each pixel [Zx(m,n)] in the zoomed domain, a relationship exists to translate the pixel back to its originator [S(K, L)] in the scene domain.

The operation of the invention is illustrated in FIGS. 5a and 5b. When line ABCD motion is first sampled by the odd field, motion in pixels A and C is detected. When 2× intelligent zoom is applied in accordance with the present teaching, pixel air AA appears on the first odd line as usual. However, for the second odd line, instead of cross-field pixel pair BB, the independent-field pixel pair AA is applied. This works the same for pixel C, which appears twice on the display odd field, as shown in FIG. 5b.

FIG. 5a is a diagram depicting odd field sampling of a moving line. FIG. 5b depicts the intelligent zoom operation of the present invention with respect to the odd field picture of FIG. 5a. Note, that there is no obvious picture tearing artifact and that the moving line is intact in its shape. Since no motion is detected of pixels associated with line 6-7, regular cross-field zoom is applied to these pixels.

Motion of line ABCD is further sampled by the even field as shown in FIGS. 5c and 5d. FIG. 5c is a diagram depicting even field sampling of a moving line FIG. 5d depicts the intelligent zoom operation of the present invention with respect to the even field picture of FIG. 5d. Again, no obvious picture tearing motion artifact should appear in the even field and, once again, line 6-7 remains intact because there is no motion.

The inventive method should be effective for electronic zoom with or without interpolation. If interpolation is applied, independent field interpolation or no interpolation would be used for pixels experiencing motion, cross-field interpolation would be used for still pixels.

An example of intelligent zoom in accordance with the present teachings is illustrated on FIGS. 6a-d. FIG. 6a depicts the original scene when pixel 18 moved to location of pixel 22. FIG. 6c and FIG. 6d are provided to show the independent-field and cross-field zoom results of FIG. 6a. FIG. 6b shows the intelligent zoom in accordance with the present teachings: independent-field zoom results are applied to pixels affected by motion while cross-field zoom results are applied to pixels not experiencing motion.

The steady state scene is shown in FIG. 4a. When scene pixel 18 moves from S(3, 2) to S(4, 1), it leaves an unknown new value X in its original place, as illustrated in FIG. 6a. Thus, pixels 18 and X have value changes. Assume a motion threshold which is set to zero and that the pixel's movement is first sampled by the odd field. The pixel with value 18 would show up on the intelligent zoom map locations (8,2), (8,3), (10,2) and (10,3), as shown in FIG. 6b, according to the conventional independent zoom algorithm (shown in FIG. 6c).

The pixel with value 13 is a static pixel. However, the pixel with value X occupying part of its territory (5,4) and (5,5) and leaves pixel locations (6,4) and (6,5) unoccupied in the intelligent zoom map. The most logical resolution to this situation is to replace the unoccupied locations with its nearest neighbor pixel 13 (as shown by the downward arrow). This action indirectly causes pixel 13 to be classified a moving pixel because of pixel X. When the even field is sampled, pixel X would show up at (5,4), (5,5), (7,4) and (7,5) because of motion. Pixel 27 is indirectly classified as a moving pixel because of pixel 18, and thus, shows up at locations (9,2), (9,3), (11,2) and (11,3). If there is no further motion, the intelligent zoom map would default back to its cross-field zoom version shown in FIG. 6d.

Using the original scene map provided in FIG. 4a as a steady state scene map, and assuming the scene map, the independent field zoom and the cross-field zoom maps provided in FIGS. 6c-d are available, a motion dependent algorithm switching method in accordance with the present teachings may be implemented from these maps for the 2× zoom. A flow diagram of an illustrative implementation of the inventive switching method is provided in FIG. 7.

As shown in FIG. 7, the inventive method 100 includes the step 104 of initialization zoom location parameters ('m' and 'n') to point to first row and first column (m=n=0) at field start. Next, at step 106, for each current pixel (m,n), locate previous and current frame S values in the original scene domain by translating the zoom domain location (m,n) back to the scene domain location S(K,L) using relationship defined in conventional independent field zoom algorithm. Next, in accordance with the present teachings, at step 108, the method tests for whether the difference between values of each respective pixel in successive frames of the S field exceeds a predetermined threshold. If the difference exceeds the threshold, then the method proceeds to step 110 at which the independent field zoomed video is outputted. If the difference does not exceed the threshold, then the method moves to step 112 at which it tests for whether the current pixel (m,n) is on any row other than the first row of the scene (check if m is greater than zero). IF not, then at step 114, the system outputs the cross-field zoomed video pixel value for pixel (m,n). However, if, at step 112, the row 'm' is greater than zero, then at step 116 the system locates the corresponding pixel value a row above in the independent-zoom map and then tests for whether the corresponding pixel value difference between successive frames is greater than a predetermined threshold. This threshold may be the same threshold as that used in step 108. Essentially, at this step 116, the system is testing whether a pixel in a row above is classified as a moving pixel by the independent zoom algorithm. If as step 116, the difference between pixel values of successive fields is found to be less than or equal to the threshold, then the system outputs the cross-field zoom video at step 114. If, however, at step 116, the difference between pixel values is greater than the threshold, the system moves to step 110 and outputs the independent zoom video values.

At step 118, the system tests for the end of field marker. If the end of field is not reached, then at step 120, the row and/or column are indexed and the system returns to step 106. Otherwise, the procedure ends at step 122.

Applying the switching method illustrated in FIG. 7, a field by field result between cross-field zoom intelligent zoom is illustrated in FIGS. 8a-f where the detector is assumed to be sampled in field interlaced fashion with a motion threshold of zero.

FIG. 8a shows an original scene of conventional detector video.

FIG. 8b shows the field of FIG. 8a after a cross-field zoom operation in accordance with conventional teaching under steady state conditions.

FIG. 8c shows the field of FIG. 8a after an intelligent zoom operation in accordance with teachings of the present invention under steady state conditions.

FIG. 8d shows the original scene without zoom after diagonal movement downward and to the left of a vertical pole of selected pixels (10, 15, 20, 25).

FIG. 8e shows an odd field display as a result of cross-field zoom after the motion depicted in FIG. 8d.

FIG. 8f shows an odd field display as a result of an intelligent zoom operation of the present invention after the motion depicted in FIG. 8d.

At steady state, both cross-field and intelligent zoom outputs are the same, as shown in FIGS. 8b and 8c. Assuming a vertical pole, consisting of pixels with values 10, 15, 20 and 25 starts to move downward diagonally at a rate of 1 pixel per field. As shown in FIG. 8d, after the movement, the replacement values for the original locations are 100, 150, 200 and 250. At field 1, odd field changes are sampled, but not the even field changes. Cross-field zoom and intelligent zoom results of the new scene are shown in FIG. 8e and 8f. Notice that pixels of value 10 are erratically shown at locations (2,8) and (2,9) of both zoom maps because the even field has not sensed the change yet. Objects in the intelligent zoom map appear to be twice the size as that of the cross-field zoom because they only occupy one field.

Now, assume the vertical pole moves another pixel down and to the left diagonally in the next field as shown in FIG. 9a.

FIG. 9a is a continuation of FIG. 8d showing the original scene of conventional detector video without zoom after two steps of diagonally downward and to the left movement of a vertical pole of selected pixels.

FIG. 9b shows the even field of FIG. 9a after a cross-field zoom operation in accordance with conventional teachings after the specified movement.

FIG. 9c shows the field of FIG. 9a after an intelligent zoom operation in accordance with teachings of the present invention after the specified movement.

Pixels of values 14, 19, 24 and 29 re-appear at the scene map after the object moved. At this point, the current pole position is sampled by the even field pixels. As illustrated in FIG. 9b, object tearing starts to show in the cross-field zoom, i.e. all pole pixels, pixel 10 and pixel 20, are not position aligned at column 4. Horizontal pixel mis-registration are shown, i.e., although pixels with values 10 and 150 are in different fields of the scene, but are shown at row 5 of cross-field map. On the other hand, as shown in FIG. 9c, the vertical pole appears to be intact (all pole pixels align at column 4) as a result of an intelligent zoom operation.

However, the algorithm might produce some side effects. For example, on the field 2 scene map, pixels of values 11, 12, 13 and 14 and 150 are horizontally aligned but what appears on row 5 of intelligent map are pixels of value 11, 12, 10, 19 and 200. Since pixels with values 19 and 200 are nearest neighbors of pixels with values 14 and 150, the pixel mis-alignments are not too obvious. In fact, the pixel at 14 is not yet sampled by field 2, replacing it with the pixel at 19 is the optimal arrangement. Other algorithm caused pixel replacements (other than pixels at values 10 and 20) are also bold typed in FIG. 9c. These minor side effects last at most two fields and are normally not perceivable by the human eye.

Assume now that the vertical pole continues to move down diagonally as illustrated in FIGS. 9d-f. FIG. 9d shows the detector scene without zoom after three steps of diagonal movement downward and to the left of a vertical pole of selected pixels. FIG. 9e shows and odd field display as a result of cross-field zoom after the motion depicted in FIG. 9d. FIG. 9f shows an odd field display as a result of intelligent zoom operation of the present invention after the motion depicted in FIG. 9d.

Object tearing with cross-field zoom is evident in FIG. 9e. Horizontal pixel mis-registration involves pixels from different fields (i.e. pixels at values 10 and 19 on row 6 of cross-field zoom map) and causes image deformation, especially when objects move at higher speed. With intelligent mapping in accordance with the present teachings, the vertical pole is still intact throughout odd-to-even and even-to-odd field transitions. Pixels affected by the side effects are shown in bold typed text, but they are all from the same field, thus, would continue to be intact with respect to position when objects move at higher speed. Again, nearest neighbor pixel replacement makes these minor and short lasting side effects less susceptible to human eyes.

The invention is intended to improve video display. Utilizing the present teachings, the moving objects should not deteriorate and should be more visually recognizable while the stationary objects should be represented in their true, undistorted zoom representation. Minor undesired effects at the trailing end of moving objects can be reduced by advanced trailing end detection algorithms well known in the art. Nevertheless, these residual side effects should be filtered out by the averaging nature of human vision.

The motion threshold value can be set to a constant or a scene adaptive value under algorithm control. For example, at high contrast scene condition, intelligent zoom artifacts are less noticeable, motion threshold can be set lower to allow quick scene response. At low contrast scene condition, system gain is higher and noise is also amplified. Not only the intelligent zoom artifacts may become more obvious, but also, noise induced pixel intensity fluctuations may cause the intelligent zoom algorithm to false trigger and creates undesirable image artifacts. Thus, in this case, the motion threshold should be set higher.

This invention can also be modified as follows without deviating from the scope of this invention:
1. if the detected motion is less than or equal to threshold (for static and slow moving objects), then apply cross-field zoom; and
2. if the detected motion is greater than the threshold, then apply field duplication zoom (as shown in FIG. 2c). This approach may be best for applications where very high speed objects are often encountered. For these fast moving objects, image tearing might show up in independent zoom mode and it may be necessary to sacrifice zoom image resolution to keep the moving object intact on the display.

With advanced algorithms to outline moving objects and their speed, the principle of this invention can be further expanded to switch among the cross-field, independent field and field duplication modes to obtain the best zoomed picture, without deviating from the scope of this invention.

The examples provided herein have illustrated the present teachings with respect to 2× zoom. However, those of ordinary skill in the art will appreciate that the present teachings can be applied to systems with different zoom factors without departing from the scope of the invention.

Interpolation algorithms can be applied to the static pixels on a pixel to pixel basis to smooth out the possibility blocky zoomed image/video.

Frame integration can also be applied to the static pixels on a pixel to pixel basis to smooth out the possibly blocky zoomed image/video.

Frame integration can also be applied to the static pixels in the intelligently zoomed image for noise reduction. Frame integration provides a noise reduced output by averaging individual pixel values from current and previous frames. Theoretically, the averaging operation would null out random noise. Noise reduction by frame integration works only for pixels with little or no value changes from frame to frame. For large frame to frame pixel value change (i.e. pixel in motion), undesired motion artifacts may result.

Cross and independent field zoom output maps such as those shown in FIGS. 6c and 6d may be analyzed to derived a sample hardware implementation configuration for a 2× intelligent zoom in accordance with the present teachings. The result is shown in FIG. 10.

Figure 10:
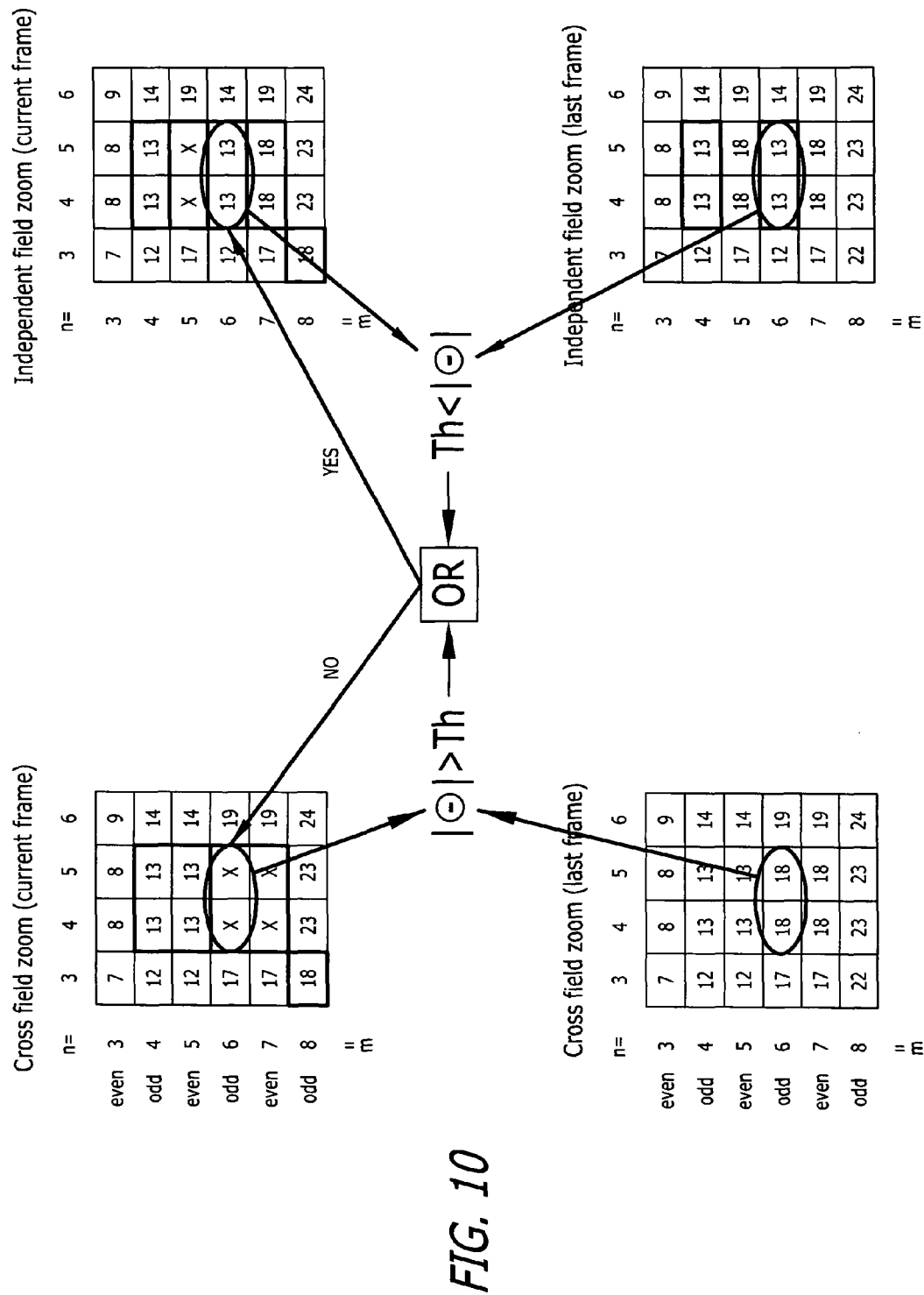
FIG. 10 illustrates how a 2× intelligent zoom pixel output is derived based on both cross and independent field zoom results of successive frames in accordance with the present teachings.

FIG. 10 illustrates how a 2× intelligent zoom pixel output is derived based on both cross and independent field zoom results of successive frames in accordance with the present teachings. For each output line, the cross-field zoom and independent field zoom for the current frame and the last frame are collected. Pixel differences between corresponding current and last frames are calculated on a pixel-by-pixel basis. If any of the differences is greater than the motion threshold, the current independent field zoom output is selected as the intelligent zoom output for pixel (m,n), otherwise, the current cross-field zoom output is selected.

Suppose the steady state condition is shown in FIG. 4a and pixel 18 moves to location of pixel 22, as demonstrated in FIG. 6a. As illustrated in FIG. 10, cross-field and independent field zoom data for output field line 6 (m=6, odd field) are obtained from the most current two detector fields. Referring to scene map of FIG. 6a, in this case the cross-field zoom data are obtained from line 3 (even field) of the detector while the independent field data are collected from line 2 (odd field) of detector. The last frame data (data from a previous frame) are also collected. Thus, for each pixel on the output line, there are four associated data values.

Pixel frame difference for each type of zoom is obtained by subtracting current and last frame data. For example, the pixel frame difference for cross-field zoom is obtained by subtracting the pixel with value X from current frame map and the pixel with value 18 from the last frame map. Absolute values of these pixel frame differences are then compared with the motion threshold. If any of these values exceeds the threshold, then the independent field zoom output (pixel 13) is output, otherwise, the cross-field zoom output (pixel X) is output for current pixel (m,n) in this example.

Figure 11:
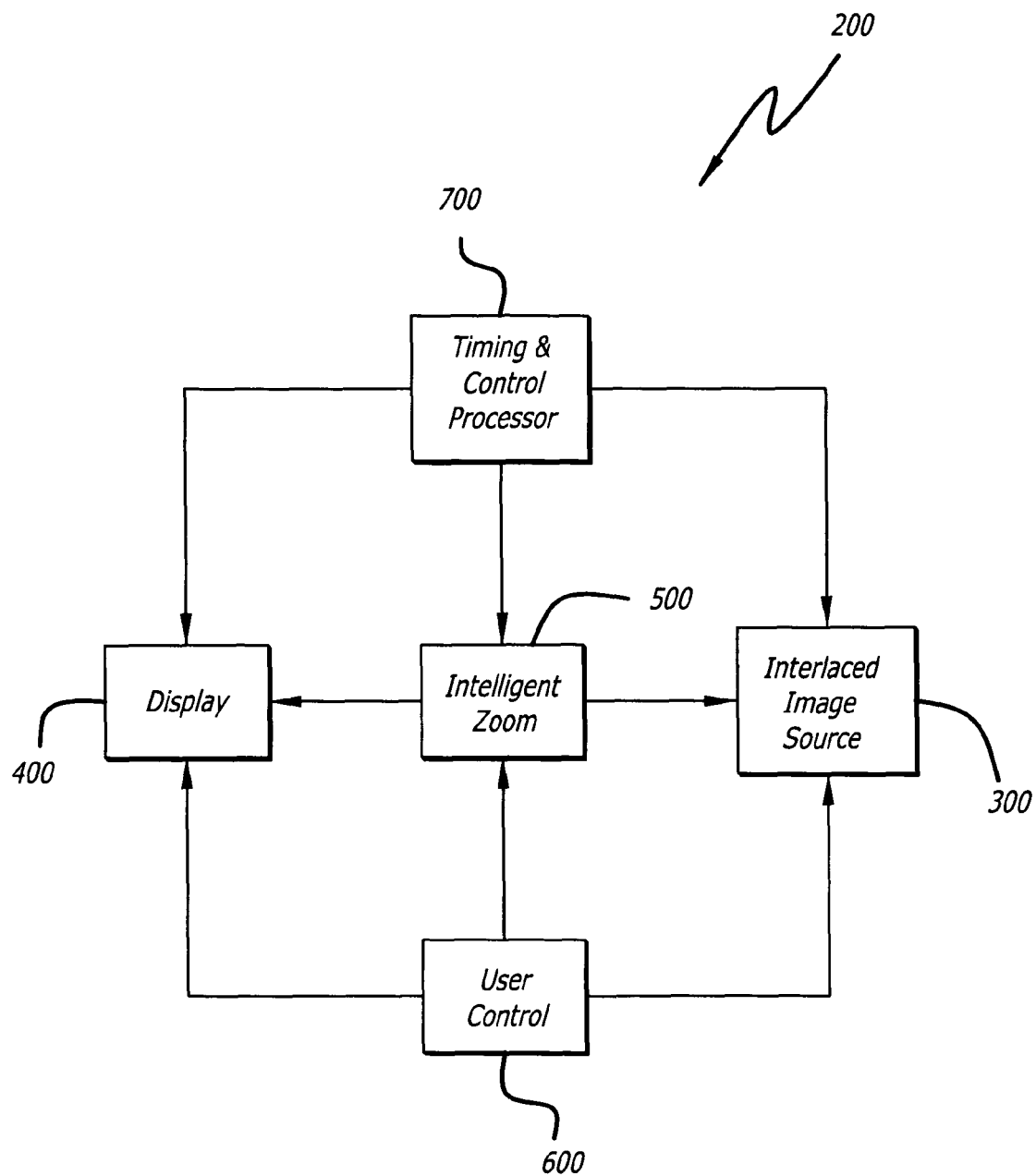
FIG. 11 is a block diagram of an imaging system showing an illustrative application of the intelligent zoom teachings of the present invention.
Figure 12:
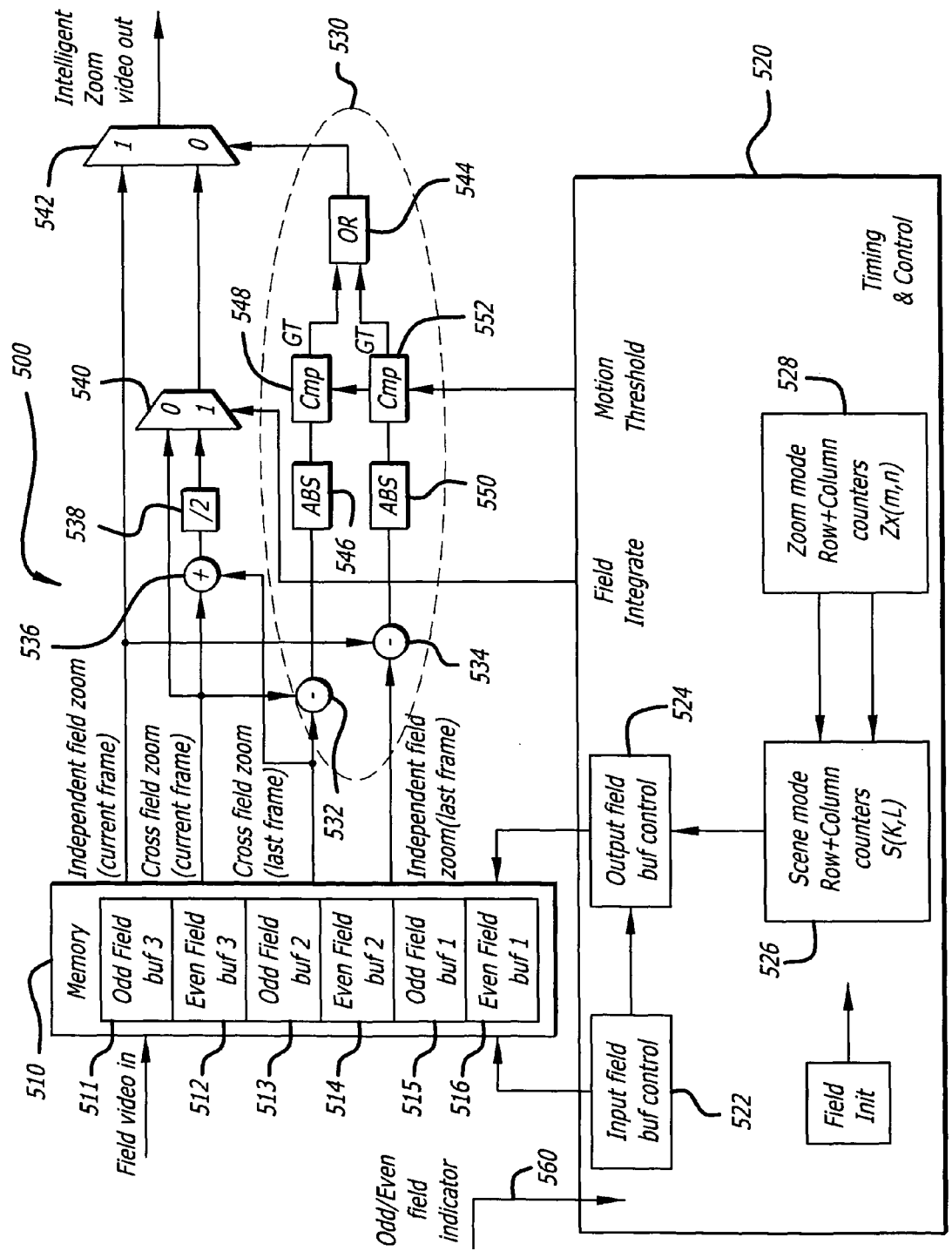
FIG. 12 is an illustrative hardware implementation of an intelligent zoom system implemented in accordance with the present teachings.

Based on FIG. 10, block diagrams of a 2× intelligent zoom hardware implementation in accordance with the invention are shown in FIGS. 11 and 12.

FIG. 11 is a block diagram of an imaging system showing an illustrative application of the intelligent zoom teachings of the present invention. In FIG. 11, the system 200 is shown as including an image source 300 which provides interlaced images to a display 400. The image source 300 may be a detector, a camera, a communication device, an image or data processor, a source of stored image data or other image source without departing from the scope of the present teachings. In accordance with the present teachings, images from the source 300 are magnified or zoomed by an intelligent zoom system 500 in response to inputs from a user via a user interface controller 600. The system 200 operates under control of a timing and control processor 700. For high speed applications, the intelligent zoom system 500 is implemented in hardware as illustrated in FIG. 12. Nonetheless, those skilled in the art will appreciate that for other less demanding applications, the intelligent zoom system 500 may be implemented in software on a general purpose computer or processor without departing from the scope of the invention.

FIG. 12 is an illustrative hardware implementation of an intelligent zoom system implemented in accordance with the present teachings. As shown in FIG. 12, the system 500 includes a memory 510 with plural even and odd field image buffers 511-516. The memory 510 receives interlaced field video from the image source 300 (FIG. 11) and input and output field buffer control signals from an input field buffer controller 522 and an output field buffer controller 524 disposed in a timing and control circuit 520. The input field buffer controller 522 consists of field buffer pointers, address counters, timing and control signals to write the incoming no-zoom Field video stream into memory 510. At the start of each field, input field buffer controller 522 checks the Odd/Even field indicator 560 and current buffer pointer count to select the field buffer that the input Field video is to be written to. Buffer pointer count is then updated and sent to output field buffer controller 524. Memory write-address and control signals are generated once the field video steam arrives.

According to FIG. 10, the intelligent zoom operation requires at least two frames of video (each frame consists of one odd and one even fields), thus, the memory 510 must contain at least 6field: 4 fields for algorithm processing and two fields to hold the incoming field video before the incoming frame is completed. These field image buffers 511-516 are written to in a circular fashion. The input field buffer ensures that the no-zoom field video is written into a different field memory buffer every field. Zoom mode row and column counters 528 reset every field and output zoom domain position row and column count Zx(m,n) into the field. This zoom domain position information is then translated into the no-zoom scene position S(K, L) by the scene mode counters 526. Please not that the field video data inside memory 511 are no-zoom scene data stored under S(K, L) address domain. The output field buffer controller 524 generates memory address and controls to fetch current and last frame cross and independent field zoom video data from the memory, based on Odd/Even field indicator 560, S(K, L) and (m, n) information received. The timing and control circuit 520 receives field initialization and odd/even field indications and outputs field integration and motion detection thresholds. Field integration on/off control may be hard-wired or come from an external user. Motion detection thresholds may be a fixed value contained inside the timing and control circuit 520 or from an external computation means. In this example, intelligent zoom processing is done on a per line basis by intelligent zoom logic 530. The intelligent zoom logic 530 includes first and second subcontractors 532 and 534 which subtract current and previous frame cross-field zoom and independent field zoom data from the non-writing memory buffers respectively. Current and last frame line data for cross and independent field zoom are retrieved from memory as data steams. Current and previous frame cross-field zoom streams are averaged by an adder 536 and divide by 2 circuit 538 (sample 2 frame field integration circuit shown here). This averaged stream is supplied to first multiplexer 540. The first multiplexer 540 is controlled by the field integrate signal from the timing and control circuit 520 so that it outputs either the current cross-field zoom frame or the average of the current and previous frames on command to the second multiplexer 542. The second multiplexer 542 outputs either the current or averaged cross-field zoom data or the current independent field zoom data based on the state of a signal supplied by an OR gate 544 or the intelligent zoom logic 530. The OR gate 544 causes the second multiplexer 542 to select the current independent field zoom frame if:

1) the absolute value of the difference between the current and previous cross-field zoom frame ascertained by a first absolute value circuit 546 exceeds the motion threshold from the timing and control circuit 520 as detected by a first comparator 548 or 2) the absolute value of the difference between the current and previous independent field zoom frames ascertained by a second absolute value circuit 550 exceed the motion threshold from the timing and control circuit 520 as detected by a second comparator 552.

The system illustrated in FIG. 12 may be implemented with a field programmable gate array, discrete logic or other suitable arrangement.

In FIG. 12, motion detection is performed based on the approach shown in FIG. 10. The field integration circuit including the adder 536, divide by 2 circuit 538 and multiplexer 540, illustrated in FIG. 12 is optional.

Thus, the present invention has been described herein with reference to a particular embodiment for a particular application. This invention is applicable to all video imaging systems with detector operating in interlace mode and employ electronic zoom with or without interpolation and/or field integration. Those having ordinary skill in the art and access to the present teachings will recognize additional modifications application and embodiments within the scope thereof.

It is therefore intended by the appended claims to cover any and all such applications, modification and embodiments within the scope of the present invention.

What is claimed is:

1. A system for providing a zoomed image comprising:
   first means for receiving first and second frames of image data;
   second means for detecting motion in said first or said second frame of image data on a pixel-by-pixel basis; and
   third means for zooming said first or said second image using both a first and a second zoom method based on a detection of motion by said second means on a pixel by pixel basis,
   wherein said third means selects a cross-field zoom method for pixels that are not affected by motion, and wherein said third means selects a different zoom method for pixels that are affected by motion.

2. The system of claim 1, wherein said different zoom method comprises an independent fields zoom method or field duplication zoom method.

3. The system of claim 1 wherein said second means tests for motion relative to a threshold.

4. The system of claim 3 wherein said threshold is a fixed threshold.

5. The system of claim 3 wherein said threshold is provided via an algorithm.

6. The system of claim 1 further including means for interpolating between zoomed frames.

7. A system for providing a zoomed image comprising:
   a memory for receiving first and second frames of image data;
   a motion detector for detecting motion in said first or said second frame of image data on a pixel-by-pixel basis; and
   an intelligent zoom system for zooming said first or said second image using both a first and a second zoom method based on a detection of motion by said motion detector on a pixel by pixel basis,
   wherein said intelligent zoom system selects a cross-field zoom method for pixels that are not affected by motion, and wherein said intelligent zoom system selects a different zoom method for pixels that are affected by motion.

8. The system of claim 7, wherein said different zoom method comprises an independent fields zoom method or field duplication zoom method.

9. The system of claim 7 wherein said motion detector tests for motion relative to a threshold.

10. The system of claim 9 wherein said threshold is a fixed threshold.

11. The system of claim 9 wherein said threshold is provided via an algorithm.

12. The system of claim 7 further including an interpolator for interpolating between zoomed frames.

13. A method for providing a zoomed image, the method comprising:
    receiving first and second frames of image data;
    detecting motion in said first or said second frame of image data on a pixel-by-pixel basis; and
    zooming said first or said second image using both a first and a second zoom method based on a detection of motion by said second means on a pixel by pixel basis,
    wherein said zooming comprises selecting both a cross-field zoom method for pixels that are not affected by motion and a different zoom method for pixels that are affected by motion.

14. The method of claim 13, wherein said selecting a different zoom method comprises selecting an independent fields zoom method or field duplication zoom.

15. The method of claim 13 wherein said step of detecting motion includes the step of detecting motion relative to a threshold.

16. The method of claim 15 wherein said threshold is a fixed threshold.

17. The method of claim 15 wherein said threshold is provided via an algorithm.

18. The method of claim 13 further including the step of interpolating between zoomed frames.

* * * * *